United States Patent
Bruhn, Jr. et al.

[15] 3,657,943
[45] Apr. 25, 1972

[54] GEAR SHIFT COUPLING MECHANISM

[72] Inventors: Max R. C. Bruhn, Jr., Spring Lake; James Vander Jagt, Jr., Muskegon, both of Mich.

[73] Assignee: Grand Haven Stamped Products, Grand Haven, Mich.

[22] Filed: Apr. 1, 1970

[21] Appl. No.: 24,702

[52] U.S. Cl. ............................74/524, 74/473 R, 74/490, 74/543, 287/23, 287/119 R
[51] Int. Cl. ..............................................G05g 1/04
[58] Field of Search................74/473 P, 473, 524, 523, 543, 74/490; 287/23, 119; 248/56

[56] References Cited

UNITED STATES PATENTS 3,406,586  10/1968  Hobbins ...........................74/473 P Primary Examiner—Milton Kaufman
Attorney—Price, Heneveld, Huizenga & Cooper

[57] ABSTRACT

A sound insulating coupling between a shift stick and a shifting mechanism constructed so that the shift stick can be coupled to the shifting mechanism in a single, quick step after installation of the shifting mechanism into an automobile. The coupling comprises an insulating lining engaging the bottom of the shift stick and a metal jacket surrounding the resilient lining and engaging the socket on the shifting mechanism selector.

10 Claims, 4 Drawing Figures

PATENTED APR 25 1972

3,657,943

INVENTOR.
MAX R.C. BRUHN JR.
JAMES VANDER JAGT JR
BY
Price, Heneveld
Huizenga & Cooper
ATTORNEYS 3,657,943

GEAR SHIFT COUPLING MECHANISM

This invention relates to a sound insulating coupling between a shift stick and a shifting mechanism.

In recent times, efforts have been made to develop quieter automobiles. One source of noise in the shift stick cars is the conduction of noise from the transmission and the engine through the shifting mechanism to the shift stick. Such conduction of noise causes vibration of the shifting stick and/or annoying hum within the automobile.

Hobbins, U. S. Pat. No. 3,406,586, discloses a sound and vibration insulating gear shift stick comprising a pair of plates which engage the bottom of the gear shift stick, a pair of rubber insulating U-shaped members surrounding the plates and a tubular socket surrounding the insulating U-shaped members. The rubber U-shaped members and the plates are first inserted into the selector socket and then the gear shift stick is inserted into the selector socket between the two plates.

I have discovered still another device for insulating the gear shift stick from the gear shifting mechanism wherein the insulating mechanism is first secured to the shifting stick through a metal jacket and then inserted into the selector socket after the shifting mechanism has been secured to a vehicle.

By various aspects of this invention, one or more of the following, or other, objects can be obtained.

It is an object of this invention to provide a simplified noise- and vibration-free coupling for a gear shift stick.

It is a further object of this invention to provide a gear shift lever coupling which is easy and quick to assemble.

It is yet another object of this invention to provide a gear shift assembly in which a noise and vibration damping mechanism is first assembled on the base of the shift stick and then the assembly is secured to the shift mechanism.

It is a still further object of this invention to provide a noise and vibration damping coupling for a gear shift stick wherein positive engagement between the stick and the selector is provided for shifting action.

It is yet another object of this invention to provide a noise and vibration damping coupling for a gear shift stick which coupling maintains its damping quality during the life of the assembly regardless of shrinkage or deformation of the damping mechanism.

Other aspects, objects, and the several advantages of this invention are apparent to one skilled in the art from a study of this disclosure, the drawings, and the appended claims.

According to the invention, there is provided a sound insulating shifting stick assembly for use with a gear shift mechanism having a selector extending out of the gear shifting mechanism, the selector lever having means at a lower end to engage various gear actuating levers depending on the position of the selector. A tubular socket is formed in the upper portion of the selector. The shifting stick assembly comprises a sound insulating lining extending substantially around the bottom portion of the shifting stick, there being provided interengaging means on the lining and the bottom of the stick to prevent axial removal of the stick from the lining when the lining is held in firm engagement with the bottom of the stick. A retainer jacket surrounds the lining and means are provided on the retainer jacket for engaging the lining to prevent axial removal of the lining from the jacket. The tubular socket on the selector receives the retainer jacket and holds the lining into firm engagement with the bottom portion of the shifting stick. Interengaging means are provided on the retainer jacket and the tubular socket for maintaining the jacket within the tubular socket and to prevent axial removal of the retainer from the socket.

In one embodiment, locating pins of a rigid material are positioned within the sound insulating lining for positive engagement of the stick with the selector socket when moving the stick for the purpose of shifting gears.

The invention will now be described with reference to the accompanying drawings in which.

Figure 1:
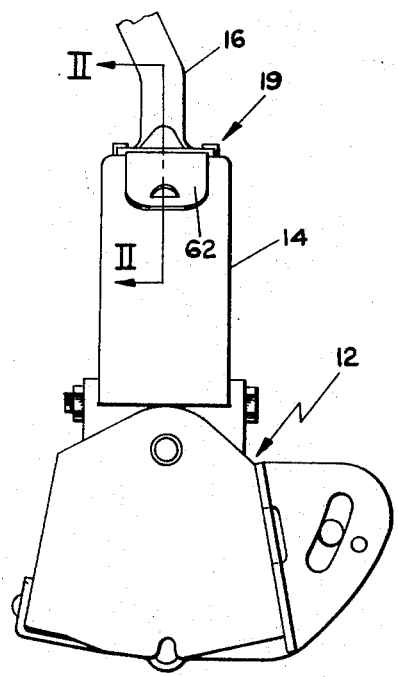
FIG. 1 is a side elevational view of a shift stick, a gear shift mechanism, and a coupling for these two parts according to the invention.
Figure 2:
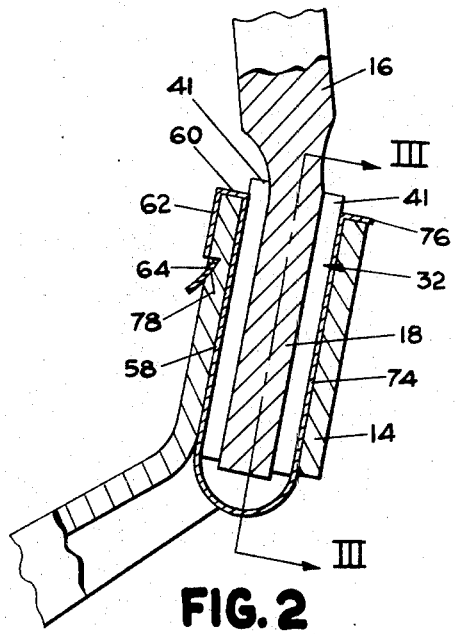
FIG. 2 is a sectional view taken along lines II—II of FIG. 1.
Figure 4:
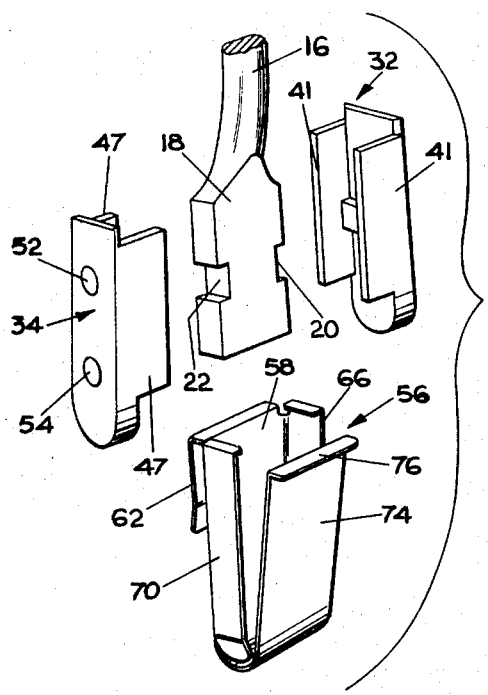
FIG. 4 is an exploded assembly view of the coupling mechanism and the bottom of the shift stick.

Referring now to the drawings, there is shown a gear shift mechanism 12 having a selector lever 14 extending upwardly therefrom. The bottom portion of the selector lever engages various gears in the shifting mechanism 12. The shifting mechanism can be any suitable mechanism such as disclosed in commonly assigned co-pending Ser. No. 797,860 filed Feb. 10, 1969. Other suitable well-known shifting mechanisms can also be employed.

The bottom portion of the stick 16 is coupled to the upper portion of the selector 14 through a coupling assembly 19. A selector engaging portion 18 at the base of the stick 16 has indentations 20 and 22 on either side between flat edge portions 24, 26 and 28 and 30 respectively.

The coupling assembly 19 comprises rubber isolation cushions 32 and 34 and a retainer jacket 56. The rubber isolation cushion 32 has a protruding portion 36 at an inner side which mates with the indentation 20 in the side of the selector engaging stick portion 18. Holes 38 are also provided in top and bottom portions of rubber isolation cushion 32 in registry with the flat edge portions 24 and 26 of the selector engaging stick portion. Pins 48 and 50 are positioned within the holes 38 in the rubber isolation cushion 32. Each pin has a length which is slightly less than the thickness of the rubber isolation cushion at the hole 38. A bottom portion 40 of the cushion 32 extends beneath the selector engaging stick portion 18. Sides 41 of the cushion 32 extend along the front and back faces of the selector engaging stick portion 18.

The rubber isolation cushion 34 is identical with the isolation cushion 32. Namely, the cushion 34 has a protruding portion 42 extending into and mating with the indentation 22 of the stick portion 18, and having sides 47, holes 44 and a bottom portion 46. Fins 52 and 54 are positioned within the holes 44. The pins 52 and 54 have an axial length slightly less than the thickness of the cushion 34 at the holes 44.

The retainer jacket 56 has a back wall 58 with an outwardly extending top flange 60 and a downwardly extending back flange 62. A tab 64 is cut from the flange 62 and bent inwardly thereof. The jacket 56 also has a side wall 66 having an inwardly bent flange 68 at the top portion thereof extending over the rubber isolation cushion 32 to retain the same within the jacket. Similarly, side wall 70 has an inwardly bent flange 72 at the top portion thereof for retaining the isolation cushion 34. A front wall 74 having an outwardly extending flange 76 extends from the bottom of the back wall 68, there being a bottom formed between the back wall 58 and the front wall 74.

The selector 14 forms a tubular socket at the upper portion thereof. An outer face of said tubular portion has an indentation 78 which receives the inwardly bent tab 64 of the retainer jacket 56. The indentation 78 has a sharp upper surface against which abuts the upper portion of tab 64.

The assembly of the coupling with the shift stick will now be described. The rubber isolation cushions 32 and 34 are positioned on the selector engaging stick portion 18 so that the protruding portions 36 and 42 engage the indentations 20 and 22 respectively. The pins 48, 50, 52, and 54 can be prepositioned within the isolation cushions 32 and 34 or can then be positioned in the isolation cushions at this time. The front wall 74 of the retainer jacket 56 is resiliently flexed outwardly sufficiently to permit the stick portion 18 containing the isolation cushions 32 and 34 to be inserted between the side walls 66 and 70. The jacket 76 is then moved so that the sides of the cushions 32 and 34 are against the back wall 58 of the jacket and the cushions are beneath the inwardly bent flanges 68 and 72. The front wall 74 then is released so that it moves back into close proximity with the other side walls of the cushions 32 and 34.

After the gear shift mechanism 12 has been secured in the proper relationship within the gear train in an automobile, for example, and the assembly of the automobile is substantially complete, then the gear shift stick, containing the coupling 19 is assembled into the selector 14. This assembly is accomplished by forcing the stick 16 containing the coupling assembly 19 downwardly into the socket of the selector 14 such that the tab 64 is received by the indentation 78. The interengagement between the tab 64 and the indentation 78 retains the jacket 56 within the selector 14 so that the jacket cannot be removed by pulling the jacket upwardly. The outwardly bent flanges 60 and 76 prevent the jacket from moving downwardly with respect to the selector socket. As has been described before, the inwardly bent flanges 68 and 72 and the bottom of the jacket 56 prevent axial movement of the rubber isolation cushions 32 and 34 with respect to the jacket 56. The interengagement between the protruding portions 36 and 42 of the cushions 32 and 34 and the indentations 20 and 22 respectively prevent axial movement of the stick 16 with respect to the cushions 32 and 34.

Thus, each of the parts has interlocking or interengaging means such that when the assembly is complete, the stick 16 is retained within the selector 14 and cannot be removed by movement in any direction. The only manner by which the stick 16 can be removed from the selector 14 is by pulling the downwardly extending flange 62 of jacket 56 outwardly to disengage the tab 64 and the indentation 78.

The cushions 32 and 34 are made from a rubbery or rubber-like material which is sound insulating. Natural and synthetic rubber as well as other rubbery polymers are suitable for the cushions 32 and 34.

The retainer jacket 56 is made from a resilient metal sheet which can be stamped with the desired configuration and then bent into the form illustrated in the drawings.

Figure 3:
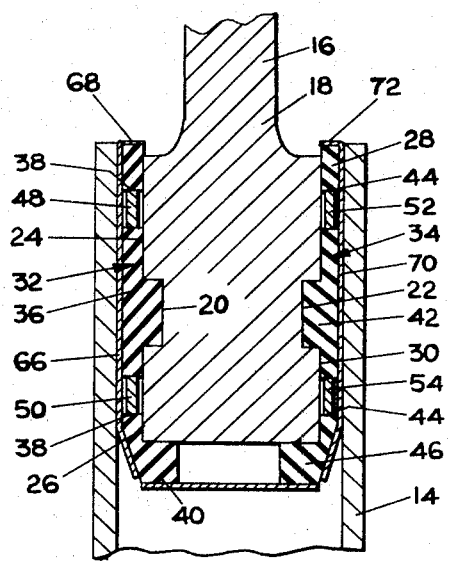
FIG. 3 is a sectional view taken along lines III—III of FIG. 2.

In the operation of the shifting mechanism, the stick is moved from right to left as viewed, for example, in FIG. 3. When the stick 16 is moved, for example, to the left, the cushion 32 will deform somewhat and the flat edge 24 of the selector engaging stick portion 18 will contact pin 48. A rigid connection will thereby be established between the edge 24 and the selector 14 through pin 48 and side wall 66 of jacket 56. At the same time, the flat edge portion 30 of the selector engaging stick portion 18 will compress the bottom of the cushion 34 so that the flat edge portion 30 will contact pin 54. A rigid connection is thereby established between the edge 30 and the socket of selector 14 through the pin 54 and the side wall 70 of jacket 56.

When moving the stick to the right as illustrated in FIG. 3, a rigid connection will be established between the edges 28 and 26 through pins 52 and 50 respectively in an identical manner.

Thus, the coupling mechanism provides a sound and vibration insulation between the shifting stick and the selector at times when no shifting is occuring. When it is desirable to shift the gears in the automobile, a rigid coupling is provided between the shift stick 16 and the selector 14.

The aforedescribed coupling mechanism has but three simple parts with the exception of the pin. The parts are easily manufactured and quickly assembled onto the shift stick. The assembly of the coupling and the shift stick takes place in a simple operation in which the coupling is snapped into place in the selector socket. Thus, the coupling can be assembled quickly and easily to the bottom of the shift stick at the point of manufacture of the shift stick. The shift stick and the coupling can then be shipped to the point at which the automobile, or other vehicle, is assembled, and the assembly between the shift stick 16 and the shift mechanism 12 can be completed in a simple one-step procedure.

The above described coupling also provides a sound and vibration damping coupling which maintains its function as it ages. Rubber and other compressible material is known to shrink or become deformed with age. Shrinkage of the rubber insulating members 32 and 34 will not deleteriously affect the function of the coupling mechanism. The retainer jacket 56 will remain securely fastened to the selector socket and there will be no contact between any two metal parts.

Reasonable variation and modification are possible within the scope of the foregoing disclosure, the drawings, and the appended claims without departing from the spirit of the invention.

The embodiments of the invention in which an exclusive property or privilege is claimed are defined as follows:

1. In a shifting stick assembly having a shifting stick and a lever member connected together, one of said stick and lever members having a female socket portion receiving a male end portion of said other stick and member; sound and vibration insulating means between said stick and lever member comprising:
   a sound insulating lining extending substantially around said end portion;
   interengaging means on said lining and the end portion to prevent axial removal of said end portion from said lining when said lining is held in firm engagement with said end portion;
   a retainer jacket surrounding said lining;
   means on said retainer jacket engaging said lining to prevent axial removal of said lining from said jacket;
   said retainer jacket positioned within said socket portion and holding said lining into firm engagement with said end portion; and
   interengaging means on said retainer jacket and said socket portion for maintaining said jacket within said socket portion and to prevent axial removal of said retainer from said socket portion.

2. The combination according to claim 1 wherein said interengaging means on said retainer jacket and said socket portion includes resilient means to permit insertion of said jacket, lining and end portion as a unit into said socket portion.

3. The combination according to claim 2 wherein said interengaging means on said retainer jacket includes said resilient means cooperating with a detent to permit a snap engagement of said interengaging means when said jacket is inserted into said socket portion.

4. The combination according to claim 1 wherein said interengaging means on said retainer jacket and said socket portion comprises a downwardly extending flange on said jacket extending along an outside wall of said socket portion, said downwardly extending flange having formed therein an inwardly and upwardly projecting tab; and said socket portion has an indentation receiving said tab, said indentation having a sharp upper edge to retain said tab within said indentation.

5. The combination according to claim 1 further comprising locating pins of a rigid material, said sound insulating lining having openings therein between said end portion and said retainer, said pins extending through said openings to provide a rigid connection between said end portion and said socket portion.

6. The combination according to claim 5 wherein said locating pins positioned between said end portion and said retainer are of a length less than the thickness of said sound insulating lining.

7. The combination according to claim 1 wherein said interengaging means on said sound insulating lining and said end portion are formed at the sides of said end portion and said insulating lining is formed in two sections to facilitate assembly of said lining to said end portion.

8. The combination according to claim 7 wherein said interengaging means between said insulating lining and said end portion further comprises indentations in the sides of the end portion and projections on the inner walls of said insulating lining, said projections mating with said indentations on said end portion sides.

9. The combination according to claim 1 wherein said retainer jacket comprises a thin metal sheet forming a back wall, side walls, and a front wall, and said retainer engaging means comprises inwardly directed flanges at the top of said side walls extending over top portions of said resilient lining.

10. A shift stick, a gear selecting lever having a socket, and an insulating assembly for coupling the bottom portion of said shift stick in said socket; said insulating assembly comprising:

a sound insulating lining engaging the bottom portion of said shift stick;
a resilient metal jacket surrounding said insulating lining;
said resilient lining being contained within said jacket;
means retaining said metal jacket and said lining on said bottom of said shift stick; and
resilient tab means on said jacket cooperating with said socket and securing said shift stick, lining and metal jacket assembled as a unit to said selector lever.

* * * * *